United States Patent
Kezuka et al.

(10) Patent No.: US 7,074,522 B2
(45) Date of Patent: *Jul. 11, 2006

(54) BATTERY

(75) Inventors: Koichiro Kezuka, Miyagi (JP);
Takahiro Endo, Kanagawa (JP)

(73) Assignee: Sony Corporation (JP)

(*) Notice: Subject to any disclaimer, the term of this patent is extended or adjusted under 35 U.S.C. 154(b) by 426 days.

This patent is subject to a terminal disclaimer.

(21) Appl. No.: 09/896,999

(22) Filed: Jul. 2, 2001

(65) Prior Publication Data

US 2002/0076617 A1 Jun. 20, 2002

(30) Foreign Application Priority Data

Jul. 3, 2000 (JP) .................................. P2000-201286

(51) Int. Cl.
*H01M 2/06* (2006.01)

(52) U.S. Cl. ......................... 429/233; 429/245
(58) Field of Classification Search ................. 429/233, 429/245, 231.95, 231.8, 223, 22
See application file for complete search history.

(56) References Cited

U.S. PATENT DOCUMENTS

| 5,200,994 A | 4/1993 | Endo |
| 5,220,599 A | 6/1993 | Endo |
| 5,467,389 A | 11/1995 | Endo |

(Continued)

FOREIGN PATENT DOCUMENTS

| EP | 0 757 397 A | 2/1997 |
| EP | 0 994 522 A | 4/2000 |
| EP | 0 996 179 A | 4/2000 |
| JP | 10 040921 A | 2/1998 |

OTHER PUBLICATIONS

Merriam–Webster's Collegiate Dictionary, Tenth Edition, p. 451, (1998).*
U.S. Appl. No. 09/446,641, filed Dec. 22, 1999, Solid Electrolytic Secondary Battery, Kezuka, Koichiro.
U.S. Appl. No. 09/504,813, filed Feb. 16, 2000, Solid–Electrolyte Battery and Manufacturing Method Therefor, Kezuka, Koichiro.
U.S. Appl. No. 09/792,708, filed Feb. 23, 2001, Electrode and Battery, and Methods of Producing the Same, Kezuka, Koichiro.

(Continued)

*Primary Examiner*—Michael Barr
*Assistant Examiner*—Monique Wills
(74) *Attorney, Agent, or Firm*—David R. Metzger; Sonnenchein Nath & Rosenthal LLP (57) ABSTRACT

To provide a battery capable of obtaining an excellent electrolyte and improved characteristics. The battery has a battery device where a positive electrode and a negative electrode are laminated with a separator in-between inside a package member. The electrolyte containing a polymer compound synthesized by polymerizing a monomer is impregnated in the separator. The synthesis of the polymer compound is inhibited by existence of Cu, thereby a negative electrode collector layer consists of foil including a metal (e.g., Ni, Cr, Au), which is not copper and does not form an alloy with lithium, or Cu foil covering the above metal. Therefore, even if the polymer compound is synthesized after fabricating the battery, polymerization can smoothly progress and content of a remained monomer can be reduced. This can prevent deterioration of battery characteristics because decomposition or reaction of the monomer is controlled even if charge and discharge are repeatedly conducted.

13 Claims, 2 Drawing Sheets

U.S. PATENT DOCUMENTS

| | | | |
|---|---|---|---|
| 5,479,496 A | | 12/1995 | Endo |
| 5,518,839 A | * | 5/1996 | Olsen .................. 429/192 |
| 5,748,621 A | | 5/1998 | Endo |
| 5,871,866 A | | 2/1999 | Barker et al. |
| 5,897,974 A | | 4/1999 | LaFleur |
| 5,968,681 A | | 10/1999 | Endo |
| 6,180,287 B1 | | 1/2001 | Endo |
| 6,190,803 B1 | | 2/2001 | Tomiyama et al. |
| 6,346,343 B1 | * | 2/2002 | Notten et al. ............. 429/60 |
| 6,350,546 B1 | * | 2/2002 | Gan et al. ................. 429/340 |
| 6,355,378 B1 | | 3/2002 | Kezuka |
| 6,395,428 B1 | | 5/2002 | Kezuka |
| 6,409,197 B1 | | 6/2002 | Endo |
| 6,436,582 B1 | * | 8/2002 | Hamamoto et al. ....... 429/340 |
| 6,482,545 B1 | * | 11/2002 | Skotheim et al. ......... 429/217 |
| 6,503,657 B1 | * | 1/2003 | Takami et al. ............ 429/188 |
| 6,569,572 B1 | * | 5/2003 | Ochiai et al. ............. 429/303 |
| 6,599,659 B1 | | 7/2003 | Kezuka |
| 6,664,005 B1 | | 12/2003 | Kezuka |
| 6,692,863 B1 | * | 2/2004 | Nakanishi et al. .......... 429/94 |
| 6,699,622 B1 | | 3/2004 | Kezuka |
| 6,720,113 B1 | | 4/2004 | Endo |
| 6,767,668 B1 | | 7/2004 | Kezuka |
| 2002/0031710 A1 | * | 3/2002 | Kezuka et al. ............. 429/303 |

OTHER PUBLICATIONS

U.S. Appl. No. 09/896,999, filed Jul. 2, 2001, Battery, Kezuka, Koichiro.

U.S. Appl. No. 10/181,504, filed Oct. 7, 2002, Polymer Electrolyte Battery and Method of Producing Same, Kezuka, Koichiro.

U.S. Appl. No. 10/487,534, filed Feb. 24, 2004, Optical Element, Light Emitting Device and Method for Producing Optical Element, Kezuka, Koichiro.

U.S. Appl. No. 09/718,767, filed Nov. 22, 2000, Nonaqueous Electrolyte Battery, Endo, Takahiro.

U.S. Appl. No. 09/741,907, filed Dec. 22, 2000, Advertisement Information Providing System, Advertisement Information Providing Method, and Computer-Readable Recording Medium Recorded with Advertisement Information Providing Program, Endo, Takahiro.

U.S. Appl. No. 09/792,708, filed Feb. 23, 2001, Electrode and Battery, and Methods of Producing the Same, Endo, Takahiro.

U.S. Appl. No. 09/896,999, filed Jul. 2, 2001, Battery, Endo, Takahiro.

U.S. Appl. No. 09/935,831, filed Aug. 24, 2001, Media-Distribution-Resource Management Apparatus and Storage Medium, Endo, Takahiro.

U.S. Appl. No. 10/105,360, filed Mar. 26, 2002, Method and System for Distributing Digital Content, and Server and Terminal Stations Therefor, Endo, Takahiro.

U.S. Appl. No. 10/181,504, filed Oct. 7, 2002, Polymer Electrolyte Battery and Method of Producing Same, Endo, Takahiro.

U.S. Appl. No. 10/434,628, filed May 8, 2003, Claw-Pole Dynamo with Radially Offset Yoke Arms, Endo, Takahiro.

U.S. Appl. No. 10/638,471, filed Aug. 12, 2003, Bicycle Hub Dynamo Assembly, Endo, Takahiro.

U.S. Appl. No. 10/648,948, filed Aug. 26, 2003, Bicycle Hub Dynamo with a Freewheel, Endo, Takahiro.

U.S. Appl. No. 10/796,240, filed Mar. 9, 2004, Battery, Endo, Takahiro.

U.S. Appl. No. 10/883,991, filed Jul. 6, 2004, Bicycle Hub Generator, Endo, Takahiro.

U.S. Appl. No. 10/994,297, filed Nov. 23, 2004, Image Forming Apparatus and Control Method Thereof, Endo, Takahiro.

Database WPI, Section Ch, Week 199817, Derwent Publications Ltd., London, GB; Class L03, AN 1998-185163; XP002265734.

* cited by examiner

BATTERY

RELATED APPLICATION DATA

The present application claims priority to Japanese Application No. P2000-20 1286 filed Jul. 3, 2000, which application is incorporated herein by reference to the extent permitted by law.

BACKGROUND OF THE INVENTION

1. Field of the Invention

The present invention relates to a battery having a positive electrode, a negative electrode and an electrolyte, more particularly, to a battery having the electrolyte containing a polymer compound synthesized by polymerization.

2. Description of the Related Art

Recently, accompanying by progress of electronics technique, a number of potable electronic equipment such as a camcorder (video tape recorder), a cellular phone and a portable computer has been popularized and advanced more miniaturization and lightning. Then, as a portable electronic source employed by the portable electronic equipment, a battery, especially, a secondary battery has been developed. Among the secondary batteries, a lithium ion secondary battery is expected to realize high energy density. Specifically, the lithium ion secondary battery excellent in flexibility with a thin foldable shape has been developed.

The battery excellent in flexibility employs a solid electrolyte without fear of leakage. As the solid electrolyte, for instance, a gel electrolyte where a polymer compound maintains a plasticizer containing an electrolyte salt, or a polymer solid electrolyte where the electrolyte salt is dissipated in the polymer compound is noteworthy. There are many reports on the gel electrolyte or polymer solid electrolyte. For example, the above-mentioned electrolytes can be produced by a simple method such that a solution containing a monomer is polymerized in order to be a gel or solid state.

Take the battery employing such electrolytes for instance, the electrolyte is fabricated by polymerizing the monomer after the positive electrode and the negative electrode are laminated with the separator in-between, then a solution containing the monomer is impregnated in the separator, or after the solution containing the monomer is applied on the positive electrode or the negative electrode.

SUMMARY OF THE INVENTION

However, in a conventional battery, a collector layer of the negative electrode is made of copper (Cu), hence, the collector layer becomes reaction inhibition factor. This prevents smooth polymerization of the monomer, thereby many unreacted monomers remain in the electrolyte. The remained monomers decompose or react in accordance with electrode reaction, which reduces charge/discharge effectiveness or charge/discharge cycle characteristics. Polymerization may be progressed by changing polymerization conditions such that reaction temperature rises. However, high reaction temperature decomposes the electrolyte, thereby charge/discharge effectiveness or charge/discharge cycle characteristics worsen.

The invention has been achieved in consideration of the above problems and its object is to provide a battery capable of obtaining an excellent electrolyte and improved characteristics.

A battery according to the present invention comprises a positive electrode, a negative electrode and an electrolyte wherein the negative electrode has a collector layer consisting of foil including a metal, which is not copper and does not form an alloy with lithium, or copper foil covering the metal and the electrolyte contains a polymer compound synthesized by radical polymerization.

A battery according to the present invention comprises a positive electrode, a negative electrode, an electrolyte and a separator wherein the negative electrode has a collector layer consisting of foil including a metal, which is not copper and does not form an alloy with lithium, or copper foil covering the metal and the electrolyte includes a polymer compound synthesized by radical polymerization.

A battery according to the present invention comprises a battery device including a positive electrode, a negative electrode, an electrolyte, and a package member enclosing the battery device wherein the negative electrode has a collector layer consisting of foil including a metal, which is not copper and does not form an alloy with lithium, or copper foil covering the metal and the electrolyte contains a polymer compound synthesized by radical polymerization.

BRIEF DESCRIPTION OF THE DRAWINGS

These and other objects and features of the present invention will become clear from the following description of the preferred embodiments given with reference to the accompanying drawings, in which.

DETAILED DESCRIPTION OF THE PREFERRED EMBODIMENTS

Embodiments of the invention will be described in detail hereinbelow by referring to the drawings.

[First Embodiment]

Figure 1:
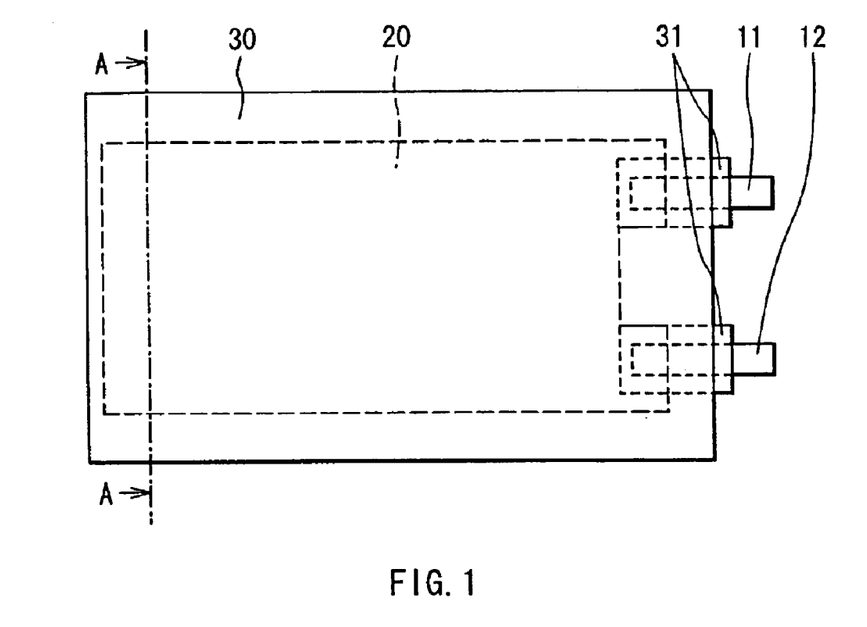
FIG. 1 is a plan view showing a structure of a battery relative to a first embodiment of the present invention.
Figure 2:
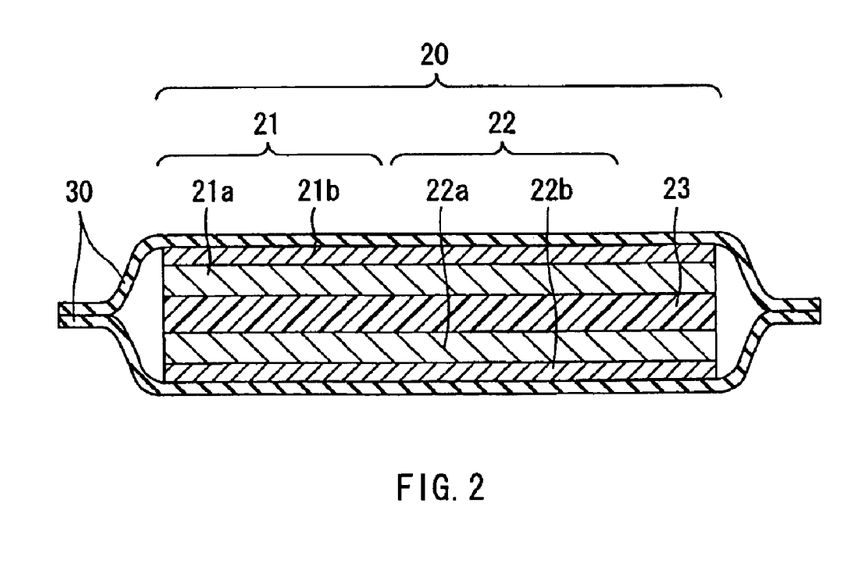
FIG. 2 is a cross sectional view along with a A—A line of the battery shown in FIG. 1.

FIG. 1 is a view showing a plan structure of a battery relative to the first embodiment of the present invention. FIG. 2 is a view showing a cross sectional structure along with the A—A line of FIG. 1. The battery has a structure such that a battery device 20 to which a positive electrode lead 11 and a negative electrode lead 12 are attached is enclosed into package members 30. The battery device 20 has a structure such that a positive electrode 21 and a negative electrode 22 are laminated with a separator 23 impregnated an electrolyte in-between.

The positive electrode 21 is provided with a positive electrode mixture layer 21a and a positive electrode collector layer 21b, and has a structure where the positive electrode mixture layer 21a is formed on one face of the positive electrode collector layer 21b. Although an illustration is omitted, the positive electrode mixture layer 21a may be formed on the both faces of the positive electrode collector layer 21b. The positive electrode collector layer 21b contains, for instance, aluminum (Al), and specifically, for instance, is made of aluminum foil.

The positive electrode mixture layer 21a is made of, for example, positive electrode materials, conducting agents such as carbon black or graphite, and binders such as polyvinylidene fluoride. As the positive electrode materials, for example, lithium composite oxide containing lithium (Li), lithium composite sulfide, metal sulfide including no lithium such as $TiS_2$, $MoS_2$, and $NbSe_2$, compounds soluble in metal sulfides such as $V_2O_5$, or oxide and specific polymer materials are preferable. One or more than two kinds of materials are selected according to the application of the battery.

Among the above materials, lithium composite oxide expressed by $Li_xMaO_2$ is preferable with the reason of gaining high energy density. In this formula, Ma preferably is/are one or more kinds of transition metals, concretely, at least one of materials among cobalt (Co), nickel (Ni) and manganese (Mn) is preferable. The value of (x) satisfies $0.05 \leq x \leq 1.10$. As specific examples of such lithium composite oxide, $LiNi_yCo_{1-y}O_2$ (where, $0 \leq y \leq 1$) and $LiMn_2O_4$ can be considered. Lithium composite oxide expressed by $LiMbPO_4$ is another example. In the formula, Mb denotes at least one element among a group consisting of cobalt, nickel, iron (Fe), manganese (Mn), copper (Cu), magnesium (Mg), zinc (Zn), calcium (Ca), cadmium (Cd), strontium (Sr) and barium (Ba). The lithium composite oxide has a so-called olivine structure.

With a similar manner to the positive electrode 21, the negative electrode 22 is provided with a negative electrode mixture layer 22a and a negative electrode collector layer 22b, and has a structure where the negative electrode mixture layer 22a is formed on one face of the negative electrode collector layer 22b. Although an illustration is omitted, the negative electrode mixture layer 22a may be formed on the both faces of the negative electrode collector layer 22b.

The negative electrode collector layer 22b consists of foil including metals, which is not copper and does not form an alloy with lithium, or copper foil covering the above metals. As such metals, the following metals are preferably considered: materials having more noble oxidation-reduction potential than copper has, such as gold (Au), silver (Ag) and paradium (Pd), or materials which a stable film is formed on a surface although its oxidation-reduction potential is unstable, such as nickel and chromium. Among the above metals, nickel and chromium are easy to handle with and economical, so that they are preferably employed in practice. For the negative electrode collector layer 22b, using copper foil covering the above metals is much preferable than using these metal foil because excellent conductivity can be obtained.

The negative electrode mixture layer 22a is made of, for instance, negative electrode materials and binders such as polyvinylidene fluoride. The negative electrode materials includes, for instance, materials capable of occluding and releasing lithium, or materials capable of depositing or dissolving lithium. Among them, the materials capable of occluding and releasing lithium as negative electrode materials are preferable with the reason of gaining excellent charge/discharge cycle characteristics. In addition, materials where the materials capable of occluding and releasing lithium are composed of the materials capable of depositing or dissolving lithium, may be employed.

As the negative electrode materials capable of occluding and releasing lithium, for example, carbonaceous materials such as non-graphitizable carbon, graphitizable carbon, and graphite can be considered. These carbonaceous materials are preferable in the following advantages: excellent charge/discharge cycle characteristics can be obtained; its stable state is kept in air; and industrial production is easy. Specifically, as the carbonaceous materials, pyrocarbons, cokes, graphites, grassy-carbons, calcinated organic polymer compounds, carbon fiber, and activated carbon can be considered. As cokes, there are pitch coke, needle coke and petroleum coke and so on. The calcinated organic polymer compounds are materials where polymer materials such as phenolic resin or furan resin are calcinated at proper temperature.

Further, as the above negative electrode materials, metals and semiconductors each can form an alloy or compound with lithium, and alloys and compounds of the metals and semiconductors also can be considered. Each of the metals, alloys, and compounds is expressed by the chemical formula $D_sE_tLi_u$. In the chemical formula, D denotes at least one kind of a metal element and a semiconductor element capable of forming an alloy or compound with lithium, and E denotes at least one kind of a metal element and a semiconductor element other than lithium and D. Each of values s, t, and u satisfies $s > 0$, $t \geq 0$, and $u \geq 0$.

Particularly, as the metals or semiconductor elements each can form an alloy or compound with lithium, metal and semiconductor elements of Group 4B are preferable. More preferable elements are silicon and tin, and the most preferable element is silicon. Alloys and compounds of those elements are also preferable. Examples of the alloys and compounds are $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, and $ZnSi_2$.

Other examples of the negative electrode materials capable of occluding and releasing lithium can be further metal oxide and polymer materials. As a metal oxide, tin oxide or the like can be mentioned. Examples of the polymeric materials are polyacetylene, and polypyrrole.

The materials capable of depositing and dissolving lithium can be, for instance, lithium metal and lithium alloy. As the lithium metal, for example, one or more than two kinds of materials among aluminum, tin, zinc, lead (Pb), silicon, gallium (Ga), indium (In), cobalt, titanium (Ti) and cadmium, and an alloy with the above materials and lithium can be considered.

The separator 23 is made of, for example, a porous film made of a polyolefin-based material such as polypropylene or polyethylene, or of a porous film made of an inorganic material such as ceramic nonwoven cloth. A structure in which two or more kinds of porous films are laminated, may be also used.

The electrolyte impregnated into the separator 23 is a so-called a gel electrolyte, and contains polymer compounds, plasticizers, lithium employed as an electrolyte salt, for instance. Preferably, part of the electrolyte is impregnated into the positive electrode mixture layer 21a and the negative electrode mixture layer 22a. For the reason of this, adhesion among the positive electrode 21, the negative electrode 22 and the electrolyte can increase.

Polymer compounds serve to maintain a shape of the electrolyte and ensure mechanical strength, and may or may not obtain ion conductivity. Such polymer compounds can be fabricated by radical polymerization on monomers such as ester-based polymer compounds, ether-based polymer compounds, and fluorine polymer compounds. In the embodiment, since the negative electrode collector layer 22b consists of foil including metals, which is not copper and does not form an alloy with lithium, or copper foil covering the above metals, polymer compounds are smoothly fabricated by polymerizing monomers without inhabitation of reaction even in a state such that the electrolyte is intermediated between the positive electrode 21 and the negative electrode 22.

The preferable polymer compounds are synthesized by polymerization at 95° C. or lower. For this reason, less monomers remain, and initial discharge capacity, charge/discharge effectiveness and capacity maintain ratio can increase.

As monomers, there are two types: monofunctional monomers having single polymerized functional group in a molecule and multifunctional monomers having more than two polymerized functional groups in a molecule. Mixed one or more than two kinds of the above monomers can be employed. Specifically, for instance, in case of forming ester-based polymer compounds, the monofunctional monomers such as methacrylic acid ester, acrylic ester, dimethacrylate ester, trimethacrylic acid ester and diacrylic ester and the like can be employed.

The plasticizer increases flexibility of the electrolyte and serves to dissolve lithium. As the plasticizer, for instance, the following materials can be considered: ester (e.g., ester acetate, butylate and ester propionic acid), ether (e.g., diethyl ester and dimethyl ether), carbonaceous ester (e.g., propylene carbonate, ethylene carbonate, diethyl carbonate and dimethyl carbonate). Mixed one or more than two kinds of the above materials are employed.

Concentration of the polymer compounds in the electrolyte is preferably in the range of, for example, 3% by mass to 50% by mass, both inclusive. Also, concentration of the plasticizer in the electrolyte is preferably in the range of 50% by mass to 97% by mass, both inclusive. For this reason, in case that concentration of the plasticizer is high and concentration of the polymer compound is too low, mechanical strength cannot be ensured although ion conductivity increases. On the other hand, in case that the concentration of the plasticizer is low, and the concentration of the polymer compound is too high, ion conductivity decreases, although mechanical strength increases.

Lithium salts can be properly $LiPF_6$, $LiBF_4$, $LiAsF_6$, $LiClO_4$, $LiCF_3SO_3$, $LiN(SO_2CF_3)_2$, $LiC(SO_2CF_3)_3$, $LiAlCl_4$, and $LiSiF_6$. Mixed more than two kinds of the above materials may be employed. Especially, $LiPF_6$ and $LiBF_4$ are preferable as a lithium salt because of excellent stability in respect of oxidation. Preferable concentration of the lithium salt in the plasticizer ranges from 0.1 mol/dm$^3$ to 3.0 mol/dm$^3$, more preferably ranges from 0.5 mol/dm$^3$ to 2.0 mol/dm$^3$.

The positive electrode lead 11 and the negative electrode lead 12 are respectively led from the inside of the package members 30 toward the outside in the same direction, for instance. Part of the positive electrode lead 11 is connected to the positive electrode collector layer 21b inside the package members 30. On the other hand, part of the negative electrode lead 12 is connected to the negative electrode collector layer 22b inside the package members 30. These positive electrode lead 11 and negative electrode lead 12 are respectively made of, for instance, metal materials such as aluminum, copper, nickel and stainless and the like.

The package members 30 are made of a laminate film where a polymer compound film, a metal film and a polymer compound film are laminated in this order. The polymer compound film is made of, for example, polyolefin resin such as polyethylene or polypropylene. The metal film is made of, for example, aluminum foil and the like.

The package members 30, the positive electrode lead 11 and the negative electrode lead 12 adhere hermetically with an adhesive film 31 in-between, which prevents entry of the air. The adhesive film 31 is made of materials having adhesion for the positive electrode lead 11 and the negative electrode lead 12. For example, in case that the positive electrode lead 11 and the negative electrode lead 12 are made of the above metallic materials, the adhesive film 31 is preferably made of polyolefin resin such as polyethylene, polypropylene, denatured polyethylene and denatured polypropylene and the like, for instance.

Next, a method for manufacturing the battery will be described.

First, a positive electrode mixture is prepared by mixing a positive electrode material, a conducting agent, and a binder. The positive electrode mixture is dispersed in a solvent of N-methyl-pyrrolidone or the like to thereby obtain a positive electrode mixture slurry. The positive electrode mixture slurry is applied on one face or both faces of the positive electrode collector layer 21b, dried, and subjected to compression molding, thereby forming the positive electrode mixture layer 21a. In such a manner, the positive electrode 21 is fabricated. Then, the positive electrode lead 11 is attached to the positive electrode collector layer 21b with weld or the like.

Next, a negative electrode mixture is prepared by mixing a negative electrode material capable of occluding and releasing lithium with a binder and dispersing the mixture in a solvent of N-methyl-pyrrolidone or the like to thereby obtain a negative electrode mixture slurry. The negative electrode mixture slurry is applied on one face or both faces of the negative electrode collector layer 22b, dried, and subjected to compression molding, thereby forming the negative electrode mixture layer 22a. In such a manner, the negative electrode 22 is fabricated. Then, the negative electrode lead 12 is attached to the negative electrode collector layer 22b with weld or the like.

Following this, the separator 23 is prepared. The positive electrode 21 and the negative electrode 22 are laminated with the separator 23 in-between by facing the positive electrode mixture layer 21a and the negative electrode mixture layer 22a each other.

After this, for instance, a monomer capable of a radical polymerization, a lithium salt, a plasticizer, and a radical polymerization initiator if needed are prepared. After these materials are mixed, the obtained mixed solution is impregnated into the separator 23. In this time, preferably, the mixed solution is also impregnated into the positive electrode mixture layer 21a and the negative electrode mixture layer 22a. As the radical polymerization initiator, for instance, diacyl peroxide, peroxide carbonate, peroxide ester, peroxide ketal, dialkyl peroxide, hydro peroxide, and azo compounds can be employed. Mixed one or more than two kinds of the above materials may be employed.

After the mixed solution is impregnated into the separator 23, for example, the package members 30 are prepared and sandwiched the battery device 20 therebetween and, subjected to compression molding with the battery device 20 in a reduced pressure atmosphere. Then, outmost parts of the package members 30 adhere each other by heat seal. In ends of the package members 30 where the positive electrode lead 11 and the negative electrode lead 12 are led, the adhesive films 31 are disposed in a manner of sandwiching the positive electrode lead 11 and the negative electrode lead 12. The outmost parts of the package members 30 adhere via the adhesive films 31.

After the outmost parts of the package members 30 adhere each other, monomers are preferably heated at determined temperature, e.g., 95° C. or lower for radical polymerization, for instance, thereby solidifying (here, gelling) the mixed solution. In this manner, the electrolyte is obtained. This completes the battery shown in FIGS. 1 and 2. Here, the negative electrode collector layer 22b consists of foil including materials, which is not copper and does not form an alloy with lithium, or copper foil covering the above metals. Therefore, polymerization of the monomers progresses smoothly without inhabitation, thereby the remain ratio of unreacted monomers considerably shows a small value. In addition, with the reason that after fabricating the battery, the monomers are polymerized, part of the electrolyte is embedded in the positive electrode mixture layer 21a and the negative electrode mixture layer 22a, which enhances adhesion among the positive electrode 21, the negative electrode 22, and the electrolyte. Further, since enough polymerization can progress, decomposition of the electrolyte or the like are restricted even if polymerization temperature is determined at low temperature, e.g., 95° C. or lower.

The battery operates as described hereinbelow.

In the battery, on charging, for instance, lithium is released from the positive electrode 21 and occluded to the negative electrode 22 via the electrolyte. On the other hand, on discharging, for instance, lithium is released from the negative electrode 22 and occluded to the positive electrode 21 via the electrolyte. Here, with the reason that the negative electrode collector layer 22b consists of foil including metals, which is not copper and does not form an alloy with lithium, or copper foil covering the metals, the monomers are enough to be polymerized and becomes polymer compounds, thereby, content of the remained monomers in the electrolyte is extremely low. Hence, decomposition or reaction of the monomers can be restricted even if charge and discharge are conducted repeatedly. This prevents deterioration of charge/discharge effectiveness and charge/discharge cycle characteristics.

As described above, according to the embodiment, the negative electrode collector layer 22b consists of foil including metals, which is not copper and does not form an alloy with lithium, or copper foil covering the metals. In case that the electrolyte includes polymer compounds obtained by polymerizing the monomers, polymerization of the monomers can progress smoothly even if in a state where the negative electrode layer 22b is adjacent to the negative electrode 22. As a result, content of unreacted monomers in the electrolyte can be extremely low. Therefore, this can prevent deterioration of battery characteristics such as charge/discharge effectiveness and charging/discharging cycle characteristics. In addition, the monomers can be polymerized in a state where the negative electrode collector 22b is adjacent to the electrode, so that adhesion among the positive electrode 21, the negative electrode 22, and the electrolyte can enhance.

Especially, in case that the negative electrode collector layer 22b consists of foil including nickel or chromium, or copper foil covering nickel or chromium, this achieves easy handling, low cost, and high conductivity.

Further, in case that the electrolyte consists of polymer compounds polymerized at 95° C. or lower, this can obtain less remained monomers and more improved initial discharge capacity, charge/discharge effectiveness and capacity maintain ratio or the like.

[Second Embodiment]

Figure 3:
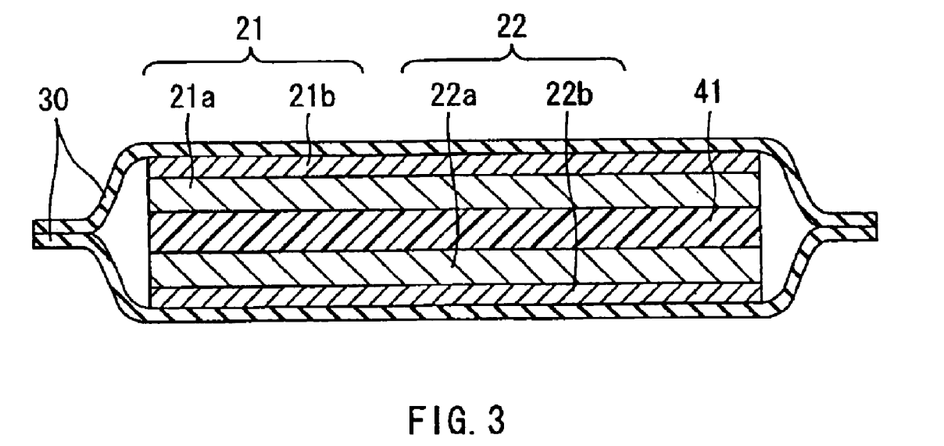
FIG. 3 is a cross sectional view showing a structure of a battery relative to a second embodiment of the present invention.

FIG. 3 is a view showing a cross sectional structure of a battery relative to the second embodiment of the present invention. FIG. 3 corresponds with the cross sectional structure along with the A—A line in FIG. 1. The battery has the same structure, function and effectiveness with the first embodiment except that an electrolyte 41 is furnished instead of the electrolyte of the battery relative to the first embodiment and the separator is not included. Hence, the same structures have the same references and the detailed explanation is omitted here.

The electrolyte 41 is a so-called polymer solid electrolyte including at least one kind of either carboxylic acid or carboxylic acid salt, polymer compounds, and lithium salts as an electrolyte salt. The electrolyte 41 is the same as the electrolyte of the first embodiment except that the plasticizer is not contained. As polymer compounds, materials having ion conductivity among the materials mentioned in the first embodiment can be employed.

In case of manufacturing the battery of the embodiment, the battery can be manufactured as same as in the first embodiment except the following points: a monomer capable of radical polymerization, a lithium salt and a radical polymerization initiator if needed are prepared, after mixing the above materials, the obtained mixed solution is applied to the positive electrode mixture layer and the negative electrode mixture layer, and then, the positive electrode and the negative electrode are laminated in a manner that each of the electrolytes directly faces each other. The battery can be manufactured in case that the plasticizer is dried and removed after forming the electrolyte containing the plasticizer as same as in the first embodiment.

Obviously many modifications and variations of the present invention are possible in the light of the above teachings. It is therefore to be understood that within the scope of the appended claims the invention may be practiced otherwise than as specifically described.

Further, specific examples of the present invention will be described in detail by referring FIGS. 1 and 2.

EXAMPLE 1

First, 1 mol of cobalt carbonate ($CoCO_3$) was mixed with 0.5 mol of lithium carbonate ($Li_2CO_3$) and calcinated at 900° C. for five hours in order to obtain $LiCoO_2$. Next, 85 part by mass of $LiCoO_2$ as a positive electrode material, 5 part by mass of graphite as a conductive agent, and 10 part by mass of polyvinylidene fluoride as a binder were mixed to prepare a positive electrode mixture. Following this, the positive electrode mixture was dissipated to N-methyl-2-pyrrolidone, which was a solvent so as to make positive electrode mixture slurry. The positive electrode mixture slurry was uniformly applied to the positive electrode collector layer 21b made of belt-shaped aluminum foil in 20 μm thickness, then dried, subjected to compression molding with a role press machine in order to form the positive electrode mixture layer 21a, thereby forming the positive electrode 21.

On the other hand, 90 part by weight of powdered graphite as a negative electrode material, 10 part by weight of polyvinylidene fluoride as a binder are mixed to prepare a negative electrode mixture. Then, the negative electrode mixture was dissipated to N-methyl-2-pyrrolidone, which was a solvent so as to make negative electrode mixture slurry. The negative electrode mixture slurry was uniformly applied to one face of the negative electrode collector layer 22b made of copper foil covering nickel in 15 μm thickness with a belt shape, then dried, subjected to compression molding with the role press machine in order to form the negative electrode mixture layer 22a, thereby forming the negative electrode 22.

After forming the positive electrode 21 and the negative electrode 22, the positive electrode lead 11 was attached to the positive electrode collector layer 21b, on the other hand, the negative electrode lead 12 was attached to the negative electrode collector layer 22b. Then, the separator 23 made of a microporous polypropylene film in 25 μm thickness was prepared to adhere the positive electrode 21 and the negative electrode 22 with the separator 23 in-between.

Following this, 5 percent by mass of methoxydiethylene glycol metacrylate, 5 percent by mass of polyethylene glycol dimetacrylate as monomers capable of radical polymerization, 20 percent by mass of propylene carbonate, 20 percent by mass of ethylene carbonate, and 50 percent by mass of diethyl carbonate as a plasticizer were mixed. Then, lithium hexafluorophosphate (LiPF$_6$) as an electrolyte salt, and bis(4-t-butylcyclohexyl)peroxide carbonate (BCHPC) as a radical polymerization initiator were dissolved into the mixed material in order to prepare a mixed solution. In this time, LiPF$_6$ was mixed into the plasticizer in a manner to obtain concentration of 1 mol/dm$^3$. 15 mol of BCHPC was mixed with 1 mol of monomers capable of radical polymerization.

After preparing the mixed solution, the mixed solution was impregnated in the separator 23 and in the vicinity of the separator 23. Then, the package members 30 were bonded with the positive electrode 21 and the negative electrode 22 with sealant 40 in-between. Then, sealing films 31 were disposed between the positive electrode lead 11 and the package member 30, and between the negative electrode lead 12 and the package member 30. After this, the outmost parts of the package members 30 or the like were subjected to thermo compression molding for adhesion, then, the monomers contained in the mixed solution was heated at 75° C. for 45 hours for radical polymerization, thereby forming the electrolyte. This obtains the battery shown in FIG. 1.

EXAMPLES 2 TO 16

The batteries were manufactured as same as in Example 1 except that the negative electrode collector layer 22b, the monomers capable of radical polymerization, the radical polymerization initiator and polymerization temperature varied as Examples 2 to 16 shown in Table 1.

TABLE 1

| | negative electrode collector layer | | monomer *1 | radical polymerization initiator *2 | polymerization temperature (° C.) | remain ratio of monomer | initial discharge capacity (mAh) | charge/ discharge effectiveness (%) | capacity maintain ratio (%) |
|---|---|---|---|---|---|---|---|---|---|
| | material | thickness | | | | | | | |
| Example 1 | copper foil covering nickel | 15 μm | M | BCHPC | 75 | <0.01 | 498 | 93 | 80 |
| Example 2 | nickel foil | 10 μm | M | BCHPC | 75 | <0.01 | 497 | 93 | 79 |
| Example 3 | copper foil covering nickel | 15 μm | A | BCHPC | 75 | <0.01 | 497 | 95 | 82 |
| Example 4 | nickel foil | 10 μm | A | BCHPC | 75 | <0.01 | 496 | 94 | 81 |
| Example 5 | copper foil covering nickel | 15 μm | M | AIBN | 90 | <0.01 | 493 | 92 | 78 |
| Example 6 | nickel foil | 10 μm | M | AIBN | 90 | <0.01 | 495 | 93 | 79 |
| Example 7 | copper foil covering nickel | 15 μm | A | AIBN | 90 | <0.01 | 495 | 93 | 78 |
| Example 8 | nickel foil | 10 μm | A | AIBN | 90 | <0.01 | 496 | 93 | 79 |
| Example 9 | copper foil covering nickel | 15 μm | M | BCHPC | 100 | <0.01 | 457 | 84 | 24 |
| Example 10 | nickel foil | 10 μm | A | BCHPC | 100 | <0.01 | 448 | 80 | 25 |
| Example 11 | copper foil covering nickel | 15 μm | M | AIBN | 100 | <0.01 | 451 | 82 | 23 |
| Example 12 | nickel foil | 10 μm | A | AIBN | 100 | <0.01 | 440 | 83 | 26 |
| Example 13 | copper foil covering gold | 15 μm | M | BCHPC | 75 | <0.01 | 496 | 93 | 80 |
| Example 14 | copper foil covering paradium | 15 μm | M | BCHPC | 75 | <0.01 | 497 | 93 | 81 |
| Example 15 | copper foil covering silver | 15 μm | M | BCHPC | 75 | <0.01 | 494 | 93 | 80 |
| Example 16 | copper foil covering chromium | 15 μm | M | BCHPC | 75 | <0.01 | 496 | 93 | 79 |

*1
M; methoxydiethylene glycol metacrylate 5 wt % + polyethylene glycol dimetacrylate 5 wt %
A; methoxydiethylene glycol acrylate 5 wt % + polyethylene glycol diacrylate 5 wt %
*2)
BCHPC; bis(4-t-butylcyclohexyl)peroxide carbonate
AIBN; azo(isobutyl nitrile)

Comparative Examples 1 to 6

As Comparative examples 1 to 6 with respect to Examples 1 to 16, the batteries were manufactured as same as in Example 1 except that the negative electrode collector layer, the monomers capable of radical polymerization, the radical polymerization initiator and polymerization temperature varied as shown in Table 2.

TABLE 2

| | negative electrode collector layer | | monomer *1 | radical polymerization initiator *2 | polymerization temperature (° C.) | remain ratio of monomer | initial discharge capacity (mAh) | charge/ discharge effectiveness (%) | capacity maintain ratio (%) |
|---|---|---|---|---|---|---|---|---|---|
| | material | thickness | | | | | | | |
| Comparative example 1 | copper foil | 10 μm | M | BCHPC | 75 | 0.42 | 287 | 44 | <1 |
| Comparative example 2 | copper foil | 10 μm | A | BCHPC | 75 | 0.51 | 201 | 38 | <1 |
| Comparative example 3 | copper foil | 10 μm | M | AIBN | 90 | 0.49 | 212 | 40 | <1 |
| Comparative example 4 | copper foil | 10 μm | A | AIBN | 90 | 0.53 | 187 | 36 | <1 |
| Comparative example 5 | copper foil | 10 μm | M | BCHPC | 100 | 0.35 | 202 | 36 | <1 |
| Comparative example 6 | copper foil | 10 μm | A | BCHPC | 100 | 0.39 | 213 | 38 | <1 |

*1)
M; methoxydiethylene glycol metacrylate 5 wt % + polyethylene glycol dimetacrylate 5 wt %
A; methoxydiethylene glycol acrylate 5 wt % + polyethylene glycol diacrylate 5 wt %
*2)
BCHPC; bis(4-t-butylcyclohexyl)peroxide carbonate
AIBN; azo(isobutyl nitrile)

(Evaluation of Examples 1 to 16)

The electrolytes were extracted from the insides of the obtained batteries in Examples 1 to 16 and Comparative examples 1 to 6 in order to conduct infrared spectroscopic analysis, which obtained 1636 cm$^{-1}$ of spectral intensity showing existence of double bond of the monomers. By the obtained spectral intensity, concentrations of the remained monomers in the electrolytes were respectively quantified. The gained results are shown in Tables 1 and 2. The remained monomer ratio after polymerization in case that the concentrations of the monomers before polymerization are determined as 1 are shown in Tables 1 and 2.

As can be known from Tables 1 and 2, the remained monomer ratio in Examples 1 to 16 respectively shows under 0.01. Compared with this, the remained monomer ratio in Comparative examples 1 to 6 shows 0.35 or more. That is, if the negative electrode collector layer 22b consists of foil including metals, which is not copper and does not form an alloy with lithium, or copper foil covering the metals, the content of the monomers can be extremely low.

The obtained batteries in Examples 1 to 16 and Comparative examples 1 to 6 were charged and discharged so as to seek the charge/discharge effectiveness, which is ratio of the discharge capacity with respect to the discharge capacity (initial discharge capacity) and charge capacity. At this moment, the batteries were charged by 100 mA of constant voltage up to reach 4.2 V of battery voltage, then by 4.2 V of constant voltage until the total charging hour reaches 15 hours. On the other hand, the batteries were discharged by 100 mA of constant voltage up to 2.5 V of the battery voltage. Charge and discharge were conducted at 23° C. The obtained results are shown in Tables 1 and 2.

As can be understood from Tables 1 and 2, the initial discharge capacity of Examples 1 to 16 shows as much as 440 mAh or more. Compared with this, that of Comparative examples 1 to 6 shows as less as 287 mAh or lower. The charge/discharge effectiveness of Examples 1 to 16 respectively shows as much as 80% or higher. Compared with this, that of Comparative examples 1 to 6 respectively shows as less as 44% or lower. That is, if the negative electrode collector layer 22b consists of foil including metals, which is not copper and does not form an alloy with lithium, or copper foil covering the metals, high initial discharge capacity and excellent charge/discharge effectiveness can be obtained. The batteries of Examples 1 to 8 and 13 to 16 achieved higher initial discharge capacity and more excellent charge/discharge effectiveness than in Examples 9 to 12. As a result, it is understood that if the monomers are polymerized at 95° C. or lower, characteristics can be improved.

Further, the batteries of Examples 1 to 16 and Comparative examples 1 to 6 were charged and discharged in 500 cycles in order to obtain capacity maintain ratio of 500$^{th}$ cycle, which is discharge capacity ratio in 500$^{th}$ cycle with respect to that in 1$^{st}$ cycle. In this moment, the batteries were charged by 500 mA of constant voltage up to reach 4.2 V of battery voltage, then by 4.2 V of constant voltage until the total charging hour reaches 2 hours. On the other hand, the batteries were discharged by 500 mA of constant voltage up to 2.5 V of the battery voltage. Charge and discharge were conducted at 23° C. The obtained results are shown in Tables 1 and 2.

As can be seen from Tables 1 and 2, the capacity maintain ratio in 500$^{th}$ cycle of Examples 1 to 16 respectively shows 23% or more, which is higher than in Comparative examples 1 to 6 showing lower than 1%. Specifically, in Examples 1 to 8 and 13 to 16, the values are as high as 78% or more can be obtained. That is, if the negative electrode collector layer 22b consists of foil including metals, which is not copper and does not form an alloy with lithium, or copper foil covering the metals, charge/discharge cycle characteristics can be improved. Especially, in case that the monomers are polymerized at 95° C. or lower, excellent charge/discharge cycle characteristics can be attained.

Although a specific explanation is omitted here, in case of employing only methoxydiethylene glycol metacrylate or polyethylene glycol dimetacrylate as a monomer, or in case of employing only methoxydiethylene glycol acrylate or polyethylene glycol diacrylate as a monomer, the same results can be obtained. In case of employing other monomers excluding these monomers, the same results can be obtained.

As described above, although the present invention was described by referring to the embodiments and examples, the present invention is not limited to the above embodiments and examples and various modifications may be employed. For instance, in the above embodiment and examples, the metals which are not copper and do not form an alloy with lithium were described by giving the specific examples, metals excluding the above, or alloys may be employed. In case that the metals are covered with copper foil, more than two kinds metals may be covered and laminated.

Although in the first embodiment and examples, the battery including the separator 23 was described, the separator 23 is not necessary to be included. Additionally, although in the second embodiment, the battery including no separator was described, the separator may be included between the positive electrode 21 and the negative electrode 22.

Although in the above embodiments and examples, the battery device 20 in a flat shape was described, the battery device 20 may be folded or rolled inside the package members 30.

Although in the above embodiments and examples, the battery including a lithium salt as an electrolyte salt was described as a specific example, the present invention can be applied to the battery including other electrolytes such as sodium (Na) salt or calcium (Ca). In this case, the positive electrode material or the like contained in the positive electrode mixture layer 21a may be selected depending on the electrolyte salts.

Although in the embodiments and examples, the battery where the battery device 20 is enclosed inside the package members 30 made of the laminate film was described, the present invention can be applied to the battery in a coin shape or a button shape. Additionally, although in the embodiments and examples, the secondary battery was described as a specific example, the present invention can be applied to other batteries such as a primary battery.

As described above, according to the battery of the present invention, the negative electrode has the collector layer consisting of foil including metals, which is not copper and does not form an alloy with lithium, or copper foil covering the metals. This can progress polymerization of the monomers smoothly even if the negative electrode is adjacent, thereby the content of unreacted monomers in the electrolyte can be extremely low in case that the electrolyte contains polymer compounds obtained by polymerizing the monomers. Hence, excellent electrolyte including less remained monomers can be attained. Accordingly, deterioration of battery characteristics can be prevented.

Specifically, according to the battery of the present invention, the negative electrode has the collector layer consisting of foil including nickel or chromium, or copper foil covering nickel or chromium, this achieves easy handling and low cost.

Especially, according to the battery of the present invention, with the reason that the electrolyte is made of polymer compounds polymerized at 95° C. or lower, less monomers remain, battery characteristics such as initial discharge capacity, charge/discharge effectiveness and capacity maintain ratio can be enhanced.

Other and further objects, features and advantages of the invention will appear more fully from the following description.

What is claimed is:

1. A battery comprising:
    a positive electrode;
    a negative electrode having a current collector selected from the group consisting of a metal foil and a copper foil covering a metal, said metal foil and said metal being separately selected from the group consisting of gold, silver, and palladium; and
    an electrolyte including a polymer compound selected from the group consisting of radically-polymerized monofunctional monomers, multifunctional monomers, and mixtures thereof;
    wherein said polymer compound is synthesized by polymerization at 95° C. or lower.

2. A battery according to claim 1, wherein the negative electrode further comprises a material capable of occluding and releasing lithium.

3. A battery according to claim 2, wherein the material is a carbonaceous material.

4. A battery according to claim 1, wherein the positive electrode comprises a lithium composite oxide.

5. A battery comprising;
    a positive electrode;
    a negative electrode having a current collector selected from the group consisting of a metal foil and a copper foil covering a metal, said metal foil and said metal being seperatley selected from the group consisting of gold, silver, and palladium;
    an electrolyte including a polymer compound selected from the group consisting of radically-polymerized monofunctional monomers, multifunctional monomers, and mixtures thereof wherein said polymer compound is synthesized by polymerization at 95° C. or lower; and
    a separator.

6. A battery according to claim 5, wherein the negative electrode further comprises a material capable of occluding and releasing lithium.

7. A battery according to claim 6, wherein the material is a carbonaceous material.

8. A battery according to claim 5, wherein the positive electrode comprises a lithium composite oxide.

9. A battery comprising:
    a battery device including a positive electrode, a negative electrode, an electrolyte, and a package member enclosing the battery device;
    wherein the negative electrode has a current collector selected from the group consisting of a metal foil and a copper foil covering a metal, said metal foil and said metal being separately selected from the group consisting of gold, silver, and palladium;
    wherein the electrolyte includes a polymer compound selected from the group consisting of radically-polymerized monofunctional monomers, multifunctional monomers, and mixtures thereof; and
    wherein said polymer compound is synthesized by polymerization at 95° C. or lower.

10. A battery according to claim 9, wherein the negative electrode further comprises a material capable of occluding and releasing lithium.

11. A battery according to claim 10, wherein the material is a carbonaceous material.

12. A battery according to claim 9, wherein the positive electrode comprises a lithium composite oxide.

13. A battery according to claim 9, wherein the package member comprises a laminate film wherein a polymer compound film, a metal film, and a polymer compound film are laminated in that order.

* * * * *